March 2, 1937. G. EATON 2,072,360
OPENER FOR SCREW CLOSURES
Filed Dec. 26, 1935
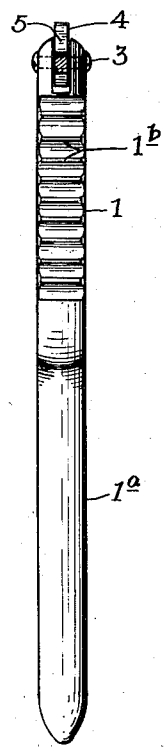
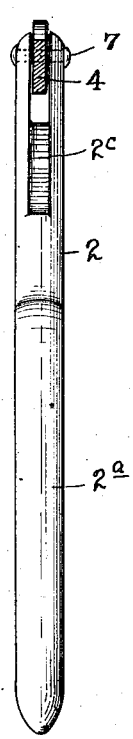
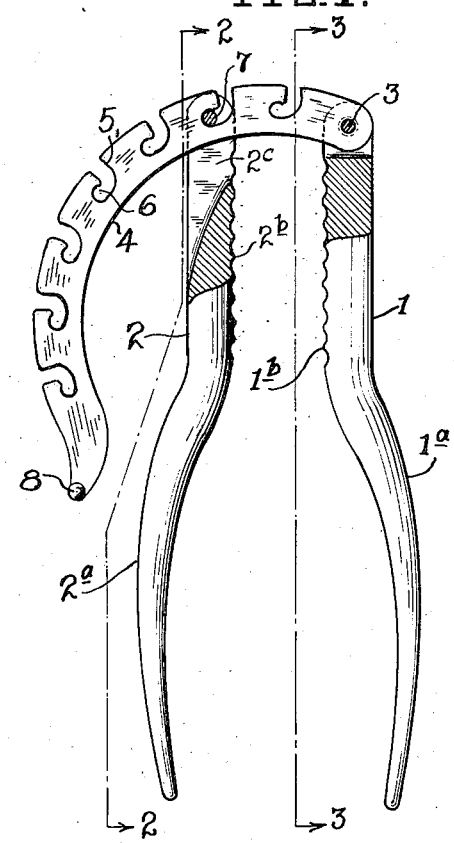
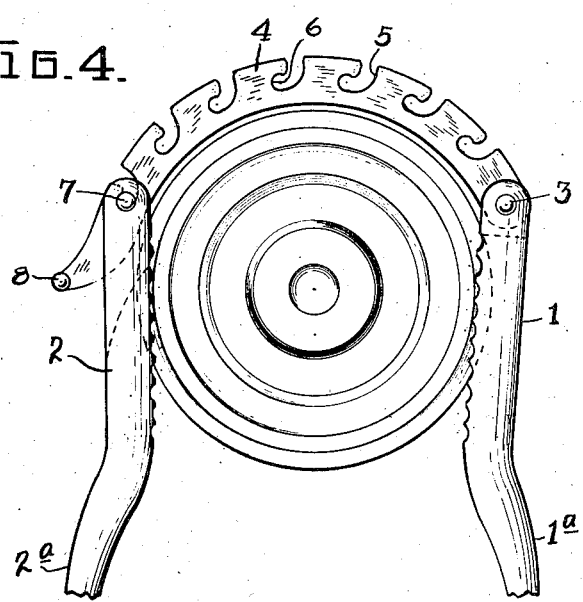
INVENTOR
GEORGE EATON
BY Milburn, and Milburn
ATTORNEYS.

Patented Mar. 2, 1937

2,072,360

UNITED STATES PATENT OFFICE 2,072,360

OPENER FOR SCREW CLOSURES

George Eaton, Cleveland, Ohio

Application December 26, 1935, Serial No. 56,260

1 Claim. (Cl. 81—3.1)

This invention relates to an improved form of opening device for screw closures.

The object of the present invention is to provide an opening device which is capable of adjustment so as to be adapted for opening screw closures of various sizes.

A further object is to provide such a device which can be manufactured and sold at a comparatively low cost and which at the same time can be manipulated and operated in a simple and dependable manner.

Other objects will appear from the following description and claim when considered together with the accompanying drawing.

Fig. 1 is an elevation of my improved device with parts broken away;

Figs. 2 and 3 are views taken on lines 2—2 and 3—3, respectively, of Fig. 1; and Fig. 4 is a plan view illustrating the manner of using my device in connection with a screw closure.

It is to be understood that the present disclosure is merely for purposes of illustration and that various other modifications may be made without departing from the spirit of the present invention as herein set forth and claimed.

This device comprises the lever arms 1 and 2 which include the handle portions 1a and 2a and the closure-gripping portions 1b and 2b, respectively. As will be observed, the handle portions 1a and 2a are curved so as to facilitate gripping and manipulating the same. The closure gripping portions 1b and 2b are transversely ribbed or corrugated so as to afford a more effective engagement with the closure.

While the lever arms 1 and 2 are here illustrated as being formed of solid metal, yet they may be made of hollow form or in any other suitable manner.

The one end of lever arm 1 is formed as a clevis for pivotal engagement at the point 3 with the one end of the intermediate member 4 which is adapted to extend in a generally transverse direction with respect to the two lever arms.

The intermediate member 4 is of curved flat form which has its outer edge portion formed with substantially L-shaped notches. These notches are spaced at suitable intervals as may be desired and comprise the radially extending slot portion 5 and the connecting transversely extending socket portion 6 which extends in a direction away from the gripping zone of the lever arm 2, as clearly indicated in the drawing.

The entrance and seating of the pin 7 in the socket 6 is facilitated by having the socket 6 rounded and by also rounding the lower corner between the slot 5 and the socket 6. The socket 6 is of such size that it effectively accommodates the pin 7 for operative engagement therein.

The transversely disposed member 4 extends through the clevis 2c provided in the one end of the lever arm 2 and the socket portions 6 are adapted to be engaged by the pin 7 which extends across the clevis portion of the lever arm 2.

While the lever arm 1 has fixed pivotal connection with the one end of the intermediate member 4, there is provided in the manner just described a temporary and adjustable pivotal connection between the one end of the lever arm 2 and the intermediate member 4. That is, the pin 7 may be inserted into the slot 5 so as to engage in the socket portion 6 at any point desired along the intermediate member 4 according to the size of the screw closure which it is intended to engage. Upon thus engaging the pin 7 in any one of the socket portions 6 and then applying the gripping portions 1b and 2b to the opposite sides of the screw closure, the compression of the user's hands upon the handle portions 1a and 2a will cause the pin 7 to be forced outwardly, that is, to the left, as viewed in the present illustration, so as to engage effectively in the socket portion 6. That is to say, the point of engagement of the lever arm 2 with the screw closure constitutes the fulcrum point of the lever arm 2.

Thus, the lever arm 2 may be caused to engage with the intermediate member 4 at any desired point therealong according to the size of the screw closure to be removed while at the same time such engagement of the pin 7 with the socket portion 6 is effective and dependable so that there is precluded any danger of accidental disengagement between these parts during actual use of the device.

Then when it is desired to change the effective space between the gripping portions of the lever arms, this may be readily accomplished by removing the pin 7 from the one slot and placing the same in engagement with another slot and socket in the same manner as already described.

The member 4 has provided upon the free end thereof a suitable form of projection 8 which prevents unintentional disassembly of the parts after they have once been assembled.

It will be observed that with my device in its various adjustments, the gripping portions 1b and 2b of the lever arms are substantially parallel to each other and as a result there is obtained an effective gripping engagement tangentially at the diametrically opposite points of the closure. Also, the curvature of the intermediate member 4 corresponds approximately to that of the average screw closure so that when this device is applied to the closure for removing the same, the inner curved portion of the member 4 may engage about the periphery of the closure as indicated in Fig. 4. In this way, there is insured an effective engagement of the gripping portions 1b and 2b with the diametrically opposite portions of the screw closure without requiring unduly long lever arms 1 and 2. The curved form of intermediate member also affords a comparatively long range of adjustment.

With my present improved device, the removal of screw closures is greatly facilitated and as a result it becomes possible for the manufacturer to apply the screw closures to their containers with a greater degree of tightness and consequently with a greater degree of sealing effect than has heretofore been the custom. Whereas up to the present time it has been necessary for the manufacturer to refrain from applying the screw closures with more than a certain degree of security because of the difficulty of removing the same, it now becomes possible with the present device to readily remove any screw closure regardless of the degree of security with which it is applied and consequently the degree of preservation of the contents may now be increased by being able to apply the closures with greater sealing effect.

This device may be adjusted so as to be applied to comparatively small screw closures of bottles, or to the screw closure of the familiar quart jar, as well as screw closures of intermediate sizes.

Also, the provision of gripping portions of substantially transverse extent, ensures effective gripping without danger of cutting through the screw thread. The gripping area of my tool is sufficient to extend transversely over a plurality of screw threads of the closure.

The structure of the present device is comparatively simple and yet highly efficient and possesses other advantages which will be obvious to those who are familiar with the art.

What I claim is:

An opening device for screw closures, comprising a pair of lever arms each having a handle portion and a substantially straight closure-gripping portion adapted for tangential engagement with the closure at diametrically opposite points, and a curved intermediate member adapted to extend partially about the closure, one of said lever arms having pivoted connection with the one end of said intermediate member, and the other of said lever arms being adjustable along said intermediate member and having temporary and adjustable connection at spaced points therealong throughout a relatively increased extent by virtue of the curved form of the intermediate member.

GEORGE EATON.